(12) United States Patent
Barrett et al.

(10) Patent No.: US 8,801,041 B2
(45) Date of Patent: Aug. 12, 2014

(54) FLUID STORAGE CONTAINER AND METHOD

(75) Inventors: Brian Barrett, Ardmore, OK (US); Brian Fowler, Como, TX (US)

(73) Assignee: Pinnacle Companies, Inc., Sulphur Springs, TX (US)

( * ) Notice: Subject to any disclaimer, the term of this patent is extended or adjusted under 35 U.S.C. 154(b) by 0 days.

(21) Appl. No.: 13/561,617

(22) Filed: Jul. 30, 2012

(65) Prior Publication Data
US 2014/0026965 A1  Jan. 30, 2014

(51) Int. Cl.
| | | |
|---|---|---|
| B60P 3/22 | (2006.01) |
| E03B 11/00 | (2006.01) |
| E04G 5/08 | (2006.01) |
| E04G 5/14 | (2006.01) |
| E06C 5/00 | (2006.01) |

(52) U.S. Cl.
USPC ........... 280/837; 280/839; 137/267; 137/899; 182/20; 182/127

(58) Field of Classification Search
USPC .............. 137/267, 343, 899, 899.4, 376, 255, 137/266; 182/20, 83, 127; 280/837, 839
See application file for complete search history.

(56) References Cited

U.S. PATENT DOCUMENTS

| | | | |
|---|---|---|---|
| 235,311 | A | 12/1880 | Stephenson |
| 289,726 | A | 12/1880 | Tevis |
| 869,210 | A | 10/1907 | Martin et al. |
| 1,651,317 | A | 11/1927 | Bell |
| 1,713,730 | A | 5/1929 | Wright |
| 1,915,757 | A | 6/1933 | Pierce |
| 2,243,723 | A | 5/1941 | Tench |
| 2,329,678 | A | 9/1943 | Pennington |
| 2,371,902 | A | 3/1945 | Long |
| 2,384,939 | A | 9/1945 | Lord |

(Continued)

FOREIGN PATENT DOCUMENTS

| | | |
|---|---|---|
| DE | 3320969 A1 | 12/1984 |
| EP | 0937606 A2 | 8/1999 |

(Continued)

OTHER PUBLICATIONS

Connecting Catwalk Corrugated Wall Liquid Storage Brochure, Dragon Products Ltd.

(Continued)

*Primary Examiner* — Craig Schneider
*Assistant Examiner* — Jonathan Waddy
(74) *Attorney, Agent, or Firm* — Vincent J. Allen; Carstens & Cahoon, LLP

(57) ABSTRACT

A fluid storage container and method is disclosed. The fluid storage container comprises a base frame that supports a tank, a tank for storing fluid, a working surface area walkway built into an end of the tank, a ladder connected near the front of the walkway to the frame, a plurality of handrails on the walkway that can be positioned depending on the required function of the tank, a plurality of strut panels that serve as floorboards on the walkway, a bridge that extends from the left and right sides of the tank to connect to other like tanks, a safety chain that connects between adjacently parked containers, and a dual manifold assembly. A method for configuring the tank's walkways as continuous walkways when parked adjacent to each other is disclosed. A dual manifold system and method for operating the manifolds is also disclosed.

16 Claims, 8 Drawing Sheets

(56) References Cited

U.S. PATENT DOCUMENTS

| | | | |
|---|---|---|---|
| 2,527,653 A | 10/1950 | Pierce | |
| 2,567,164 A | 9/1951 | Brehany et al. | |
| 2,726,123 A | 12/1955 | Mathews et al. | |
| 2,727,286 A | 12/1955 | Moore | |
| 2,861,391 A | 11/1958 | Smith et al. | |
| 2,877,858 A | 3/1959 | Knight | |
| 2,904,126 A | 9/1959 | Meng et al. | |
| 3,084,638 A | 4/1963 | Allegrette | |
| 3,225,362 A | 12/1965 | Barrera | |
| 3,262,517 A * | 7/1966 | Malec | 182/2.6 |
| 3,489,320 A | 1/1970 | MacKinnon | |
| 3,490,558 A * | 1/1970 | Foley | 182/103 |
| 3,510,142 A | 5/1970 | Erke | |
| 3,726,431 A | 4/1973 | Botkin | |
| 3,793,178 A | 2/1974 | Austin et al. | |
| 3,884,373 A | 5/1975 | Archibald | |
| 3,997,024 A | 12/1976 | Fredricks et al. | |
| 4,018,354 A | 4/1977 | Lawler | |
| 4,068,777 A | 1/1978 | Humphrey et al. | |
| 4,106,423 A | 8/1978 | Glasfeld et al. | |
| 4,108,326 A | 8/1978 | Bertolini | |
| D253,051 S | 10/1979 | Pletcher | |
| 4,171,550 A | 10/1979 | Phaup | |
| 4,230,048 A | 10/1980 | Gordon et al. | |
| 4,244,523 A | 1/1981 | Looper | |
| 4,258,953 A | 3/1981 | Johnson | |
| 4,318,549 A | 3/1982 | Pletcher | |
| 4,351,478 A | 9/1982 | Looper | |
| 4,406,471 A | 9/1983 | Holloway | |
| 4,422,485 A | 12/1983 | O'Shea et al. | |
| 4,572,328 A | 2/1986 | Benko | |
| 4,589,565 A | 5/1986 | Spivey | |
| 4,613,053 A | 9/1986 | Kimura et al. | |
| 4,718,353 A | 1/1988 | Schuller et al. | |
| 4,787,111 A | 11/1988 | Pacek et al. | |
| D301,326 S | 5/1989 | Adams | |
| 4,874,184 A | 10/1989 | Boyer | |
| 5,004,269 A | 4/1991 | Pelt | |
| D318,033 S | 7/1991 | Pelt | |
| 5,033,637 A | 7/1991 | Webb | |
| 5,054,635 A | 10/1991 | Kolom | |
| 5,058,924 A | 10/1991 | Whatley, Jr. | |
| 5,122,025 A | 6/1992 | Glomski | |
| 5,213,367 A | 5/1993 | Norman, Jr. et al. | |
| 5,220,933 A | 6/1993 | Albers | |
| 5,273,180 A | 12/1993 | Whatley, Jr. | |
| 5,294,016 A | 3/1994 | Crenshaw | |
| 5,301,980 A | 4/1994 | Dingle | |
| D348,304 S | 6/1994 | Norman, Jr. et al. | |
| 5,346,093 A | 9/1994 | De Benedittis et al. | |
| D353,352 S | 12/1994 | Holloway, Jr. | |
| 5,538,286 A | 7/1996 | Hoff | |
| D375,470 S | 11/1996 | Adams | |
| 5,607,133 A | 3/1997 | Markham et al. | |
| D378,810 S | 4/1997 | Norman, Jr. et al. | |
| D379,948 S | 6/1997 | Wade | |
| 5,653,469 A | 8/1997 | Wade | |
| 5,671,855 A | 9/1997 | Norman, Jr. et al. | |
| D384,913 S | 10/1997 | Norman, Jr. et al. | |
| 5,676,460 A | 10/1997 | Biberstine et al. | |
| 5,678,978 A | 10/1997 | Markham | |
| 5,718,382 A | 2/1998 | Jaeger | |
| 5,743,191 A | 4/1998 | Coslovi | |
| 5,816,423 A | 10/1998 | Fenton et al. | |
| 5,957,500 A | 9/1999 | Wade | |
| D417,171 S | 11/1999 | Satterfield et al. | |
| 5,979,335 A | 11/1999 | Saxton et al. | |
| 6,045,157 A | 4/2000 | Poulin | |
| 6,098,744 A | 8/2000 | Kawamura | |
| 6,152,492 A | 11/2000 | Markham et al. | |
| 6,173,991 B1 | 1/2001 | Piona et al. | |
| 6,176,279 B1 | 1/2001 | Dahlin et al. | |
| 6,199,910 B1 | 3/2001 | Wade | |
| D441,692 S | 5/2001 | Niblett et al. | |
| 6,279,955 B1 | 8/2001 | Fisher | |
| 6,354,787 B1 | 3/2002 | O'Daniel | |
| 6,375,222 B1 | 4/2002 | Wade | |
| 6,390,325 B1 | 5/2002 | Gonzales | |
| 6,431,093 B1 | 8/2002 | Hansen | |
| 6,645,016 B1 | 11/2003 | Andersen et al. | |
| 6,659,225 B2 | 12/2003 | Olliges et al. | |
| 6,761,414 B1 | 7/2004 | Broberg | |
| 6,793,178 B2 | 9/2004 | Peterson | |
| 6,799,975 B1 | 10/2004 | Dunn | |
| 6,915,815 B1 * | 7/2005 | Ness | 137/259 |
| 6,957,806 B2 | 10/2005 | Tubbs | |
| 7,080,806 B2 | 7/2006 | Mills | |
| 7,228,936 B2 | 6/2007 | Wyse et al. | |
| 7,244,123 B1 | 7/2007 | Barron | |
| 7,300,073 B2 | 11/2007 | Bachman | |
| D557,178 S | 12/2007 | Petzitillo, Jr. et al. | |
| 7,387,316 B2 | 6/2008 | Keiser | |
| 7,413,377 B2 | 8/2008 | Pontano, III | |
| 7,448,586 B2 | 11/2008 | Ziaylek et al. | |
| 7,472,663 B1 | 1/2009 | Horn | |
| 7,503,535 B2 | 3/2009 | Ziaylek | |
| 7,624,843 B2 * | 12/2009 | Cresswell | 182/63.1 |
| 7,762,588 B2 | 7/2010 | Markham | |
| 7,815,222 B2 | 10/2010 | Markham | |
| 7,900,936 B2 | 3/2011 | Imai | |
| 7,997,441 B2 | 8/2011 | Marcel | |
| 8,365,937 B2 | 2/2013 | Lovelace et al. | |
| 8,376,167 B2 | 2/2013 | Lovelace et al. | |
| 2003/0020253 A1 | 1/2003 | Bosman et al. | |
| 2005/0115621 A1 | 6/2005 | Van Vliet et al. | |
| 2008/0251322 A1 | 10/2008 | Irvin | |
| 2009/0090581 A1 * | 4/2009 | Kennedy | 182/62.5 |
| 2010/0013206 A1 | 1/2010 | Markham | |
| 2010/0032435 A1 | 2/2010 | Satterfield et al. | |
| 2011/0265685 A1 * | 11/2011 | Swygert | 105/425 |

FOREIGN PATENT DOCUMENTS

| | | |
|---|---|---|
| FR | 2595999 A1 | 9/1987 |
| FR | 2655172 A1 | 5/1991 |
| FR | 2670453 A1 | 6/1992 |
| JP | 9240359 A | 9/1997 |

OTHER PUBLICATIONS 10,000 to 21,000 Gal Frac Tanks Brochure, Dragon Products Ltd.

* cited by examiner

FLUID STORAGE CONTAINER AND METHOD

BACKGROUND OF THE INVENTION

1. Technical Field of the Invention

The technology relates to the field of fluid storage tanks, and more particularly to movable fluid storage tanks that can be used to contain water or brine, for example, in connection with oil and gas production.

2. Description of the Related Art

There has been an increasing demand for energy worldwide. As a result, many different technologies are being used to meet this demand, and many are under development. Current technologies include, for example, traditional oil and gas production, secondary and enhanced oil and gas recovery techniques, coal production, use of solar panels and wind turbines to generate electricity, production of bio-fuels, use of ocean waves to generate electricity, and the use of nuclear reactors to generate electricity. It is known that in several parts of the world there are large subterranean reservoirs of natural gas, a desirable clean burning fuel, held in relatively impermeable geological formations. The relative impermeability of these formations presents a challenge to the production of these gas reserves because the gas is "tightly held" within the formations and cannot readily flow to a production well.

The technique of hydraulic fracturing of impermeable subterranean formations is being used to produce gas from relatively impermeable formations. Hydraulic fracturing, also known as "fracking" or "hydro-fracking," is a technology that fractures underground formations creating flow pathways for release of the trapped natural gas and production of that gas for commercial purposes. Fracking operations require large quantities of water, and consequently, means for storing the water and other fluids are required.

During gas production, "brine" containing injected chemicals is produced. This brine must be disposed of in an environmentally acceptable manner. Thus, after fracking, means for storing the brine produced are required.

Brine and other fluids may be stored in portable storage tanks for a period of time. There are several different portable tank designs. However, they should preferably meet criteria of durability and resistance to deterioration under the conditions of use, and should be relatively easy and inexpensive to use and maintain.

Although this background discusses use of a fluid storage container in the context of natural gas production, the invention is not intended to be limited to this application. The tanks disclosed herein can be used in any application requiring movable fluid storage. As used herein, "fluid" is intended to generally cover materials that can be stored in a fluid storage tank trailer. For example, water, slurry, mixtures, suspension, or other flowable materials would be considered "fluids."

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

SUMMARY

The following is a summary of some aspects and exemplary embodiments of the present technology, of which a more detailed explanation is provided under the Detailed Description section, here below.

One exemplary embodiment of the invention includes a fluid storage container comprising a movable fluid storage tank having a body supported by a frame said tank having a deck built into said body for providing an elevated working surface for a user that is lower than a top of said tank and wherein said working surface extends across a width of said tank.

Another exemplary embodiment comprises a tank for holding fluids, an internal manifold for use during below freezing temperatures said internal manifold comprising a plurality of flanges connected to a plurality of feeder pipes, said plurality of flanges positioned outside a wall of said tank and said plurality of feeder pipes extending through said wall, said internal manifold comprising a central pipe in fluid communication with said plurality of feeder pipes, and an external manifold positioned outside said wall for use during above freezing temperatures said external manifold connected through said wall to said central pipe.

Another exemplary embodiment of a method in of using a fluid storage container having a dual manifold assembly comprising the steps: utilizing an internal manifold of said fluid storage container to move fluid in and out of said fluid storage container when an outside temperature is below freezing wherein a majority of the surface area of said internal manifold is contained within the fluid storage container to help prevent the manifold from freezing when said outside temperature is below freezing; and utilizing an external manifold of said fluid storage container to move fluid in and out of said fluid storage container when said outside temperature is above freezing.

BRIEF DESCRIPTION OF THE DRAWINGS

For a more full understanding of the advantages provided by the invention, reference should be made to the following detailed description together with the accompanying drawings wherein.

Figure 1:
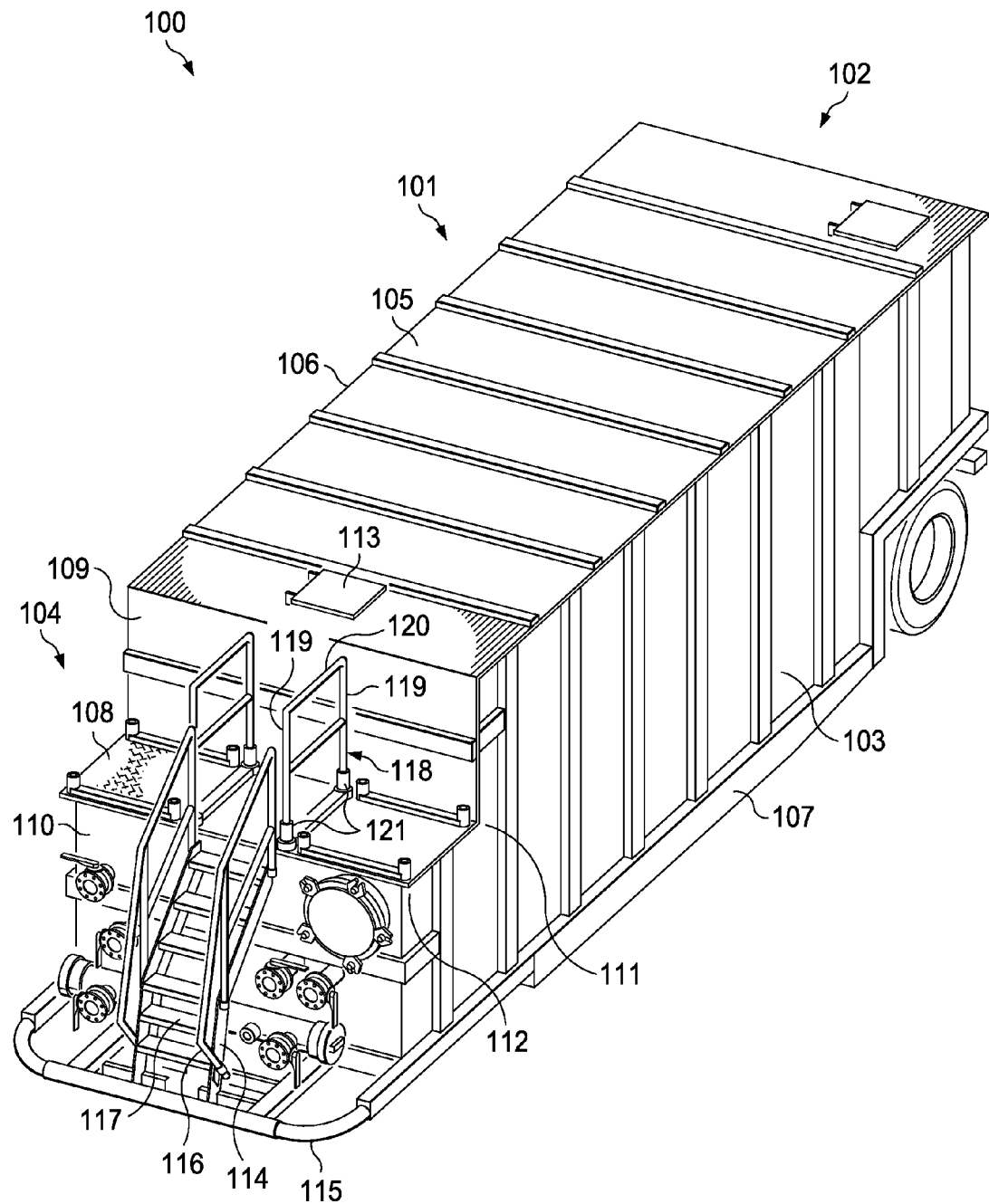
FIG. 1 is a perspective view of an exemplary embodiment of a fluid storage tank.

All figures are drawn for ease of explanation of the basic teachings of the present invention only; the extensions of the figures with respect to number, position, relationship, and dimensions of the parts to form the exemplary embodiments will be explained or will be within the skill of the art after the following teachings of the present invention have been read and understood.

DETAILED DESCRIPTION OF THE INVENTION

While this invention is susceptible of embodiment in many different forms, there is shown in the drawings and will herein be described in detail exemplary embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the exemplary embodiments, wherein these innovative teachings are advantageously applied to the particular problems of a FLUID STORAGE CONTAINER AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

FIG. 1 illustrates an exemplary embodiment of the fluid storage container 100. The storage container comprises a tank 101 that is generally described as having a rear end 102, an elongated first side 103 extending between the rear end 102 and a front end 104, a roof 105 extending from the rear end 102 to the front end 104, the front end 104 opposite the rear end 102, a second side 106 opposite the first side 103, and a base 107 opposite the roof 105. In this example the front end 104 comprises a built in walkway 108. However, the invention is not limited to the walkway 108 being built into the front end 104 or only one walkway 108 being built into the tank 101. The end with the walkway 108 built into it, here, the front end 104, consists of a front wall 110 and an intermediate wall 109 spaced apart horizontally by the walkway 108. The back edge 111 of the walkway 108 is adjacent and connected to the intermediate wall 109, which is connected to the roof 105 of the tank 101. The front edge 112 of the walkway 108 is adjacent and connected to the front wall 110, which is connected to the base 107.

The fact that the walkway 108 is built into the body of the tank 101 reduces the expense associated with maintaining and replacing worn out walkways that are separately attached to the tanks. It also allows the tank to have a shorter overall length, to ease compliance with highway regulations, while still allowing the tank to hold approximately 500 barrels of fluid. The walkway 108 is generally elevated to provide personnel the ability to inspect the contents of the tank 101 via a man way 113. However, the height of the walkway 108 may vary.

The portion of the tank with the walkway built into it, here, adjacent the front edge 110, contains a ladder 114 attached to it that extends down and away from the front edge 112 of the walkway 108 and is connected to a frame 115. The ladder 114 comprises handrails 116 that extend vertically from the frame 115 to the walkway 108 and a plurality of steps 117 spaced from each other that allow personnel to walk up the steps 117 from the ground to the walkway 108.

FIG. 1 also depicts one of the positions for the walkway handrails 118. The walkway handrails 118 comprise legs 119 and rails 120 intersecting those legs 119 that act as handrails. In this example, the legs 119 of the handrails 118 are secured into receptacles 121 that run in-line with the ladder handrails 116. Although not shown, the legs 119 can be secured into the receptacles 121 with a locking device, such as a retaining pin, a bolt, and the like as is known in the art. This position provides assistance to personnel who only need to check the man way 113 on one fluid storage container.

Figure 2:
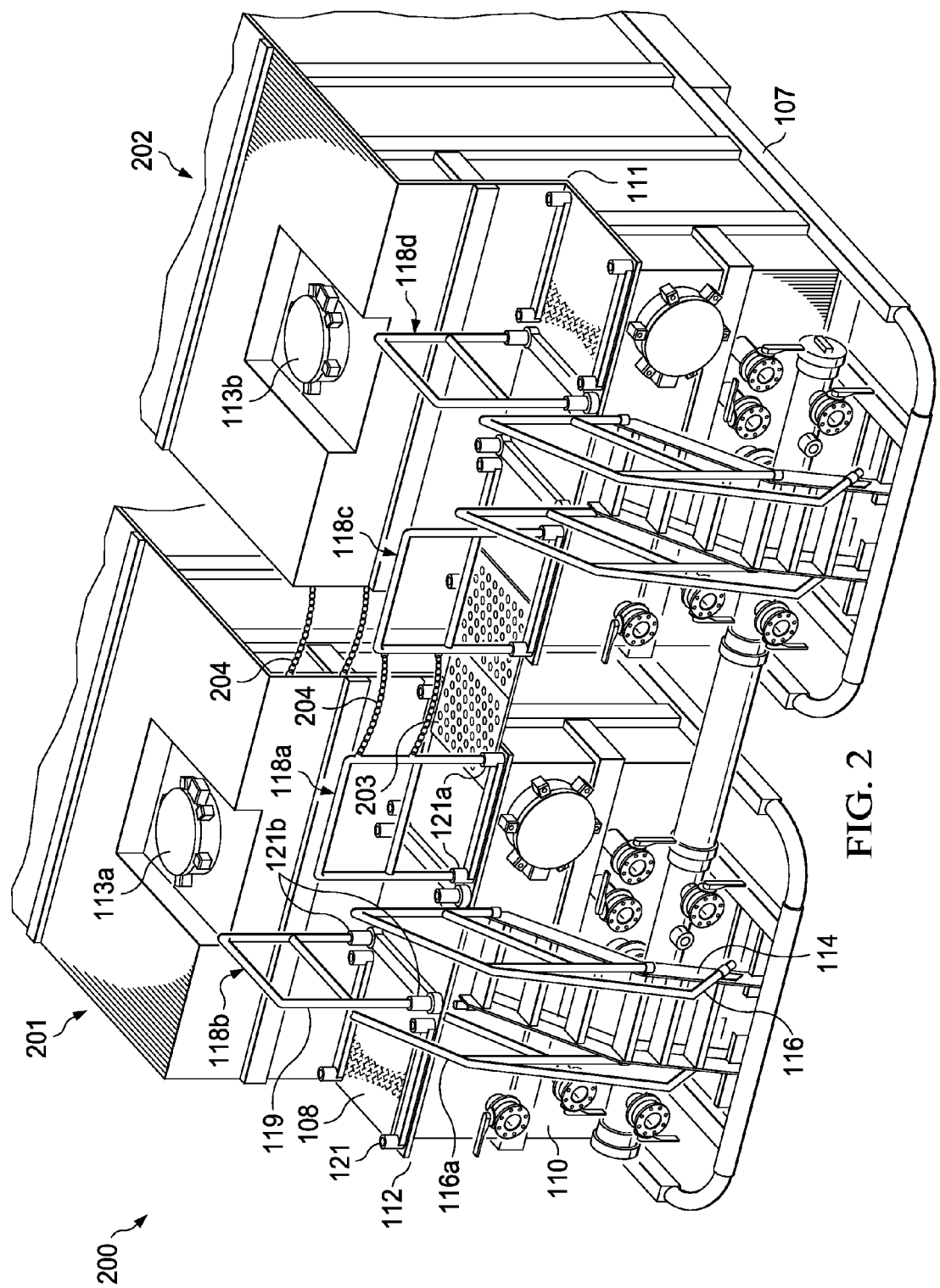
FIG. 2 is a front perspective view of an exemplary embodiment of fluid storage tanks parked adjacent to each other.

FIG. 2 is a perspective view of an exemplary embodiment of two fluid storage tanks 201, 202 parked adjacent to each other. In this embodiment, the positions of the handrails 118 allow the walkway 108 to be used as a walkway to an adjacent tank. The legs 119 of the first handrail 118a on the first tank 201 are secured in receptacles 121a located on the front edge 112 of the walkway 108 adjacent to the wall portion 110. The legs 119 of the second handrail 118b on the first tank 201 are secured in receptacles 121b that are generally in-line with the ladder handrail 116a.

The handrails 118c, 118d on the second tank 202 are aligned similarly as shown in FIG. 2. The receptacles 121 as shown in FIG. 2 are generally round shaped to allow round shaped legs 119 to fit securely in place. However, the present invention is not limited to round receptacles 121 and round handrail legs 119. Any number of shapes can be used for the receptacles 121 and legs 119, such as square, rectangular, or others. Further, the receptacles 121 are shown as protruding from the surface of the walkway 108. However, the receptacles 121 could be sunken in the walkway 108.

A bridge 203 that can be made from a plurality of materials is connected from the end of one tank's walkway 108 to the end of an adjacent tank's walkway 108 to provide a continuous walkway between multiple tanks 201 and 202. Safety chains 204 are connected between the handrails 118 and between the sides of the tanks 201 and 202 above the bridge 203 to prevent personnel from falling as they walk between the tanks. Since the ladder 114 extends from the front edge 112 of the walkway 108 of the tank, personnel are able to ascend to the walkway of any tank when more than one are parked adjacent to each other, traverse the walkway checking man ways 113a, 113b, and descend from any tank without having to walk all the way to the last tank to climb down a ladder located on the side of a tank as is done in some prior art tanks.

Although the drawing of FIG. 2 illustrates only two tanks connected together, it is contemplated that any number of tanks can be connected together in the manner disclosed with the handrails 118 of the intermediate tanks all inserted into their respective receptacles located adjacent the front edge 110 of the tanks and the two end tanks configured as shown in FIG. 2.

Figure 3:
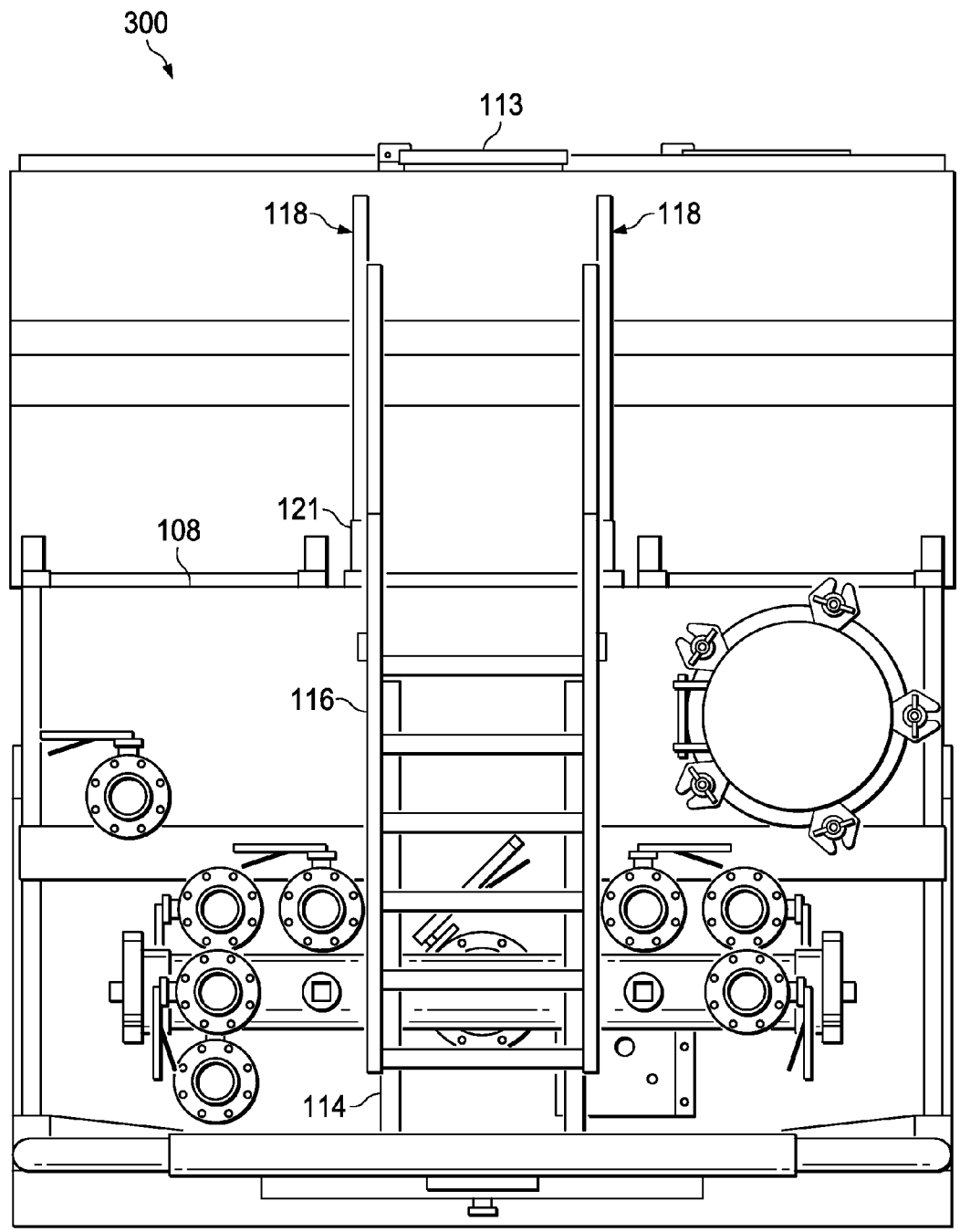
FIG. 3 is a front view of an exemplary embodiment of a fluid storage tank of the present invention.

FIG. 3 is a front view of an exemplary embodiment of a fluid storage tank 300. FIG. 3 provides a view of the handrails 118 positioned in receptacles 121 generally in-line with the ladder railings 116. This position limits personnel to monitor the top man way 113 and prevents utilization of the walkway 108 except for the portion located between the handrails 118.

Figure 4:
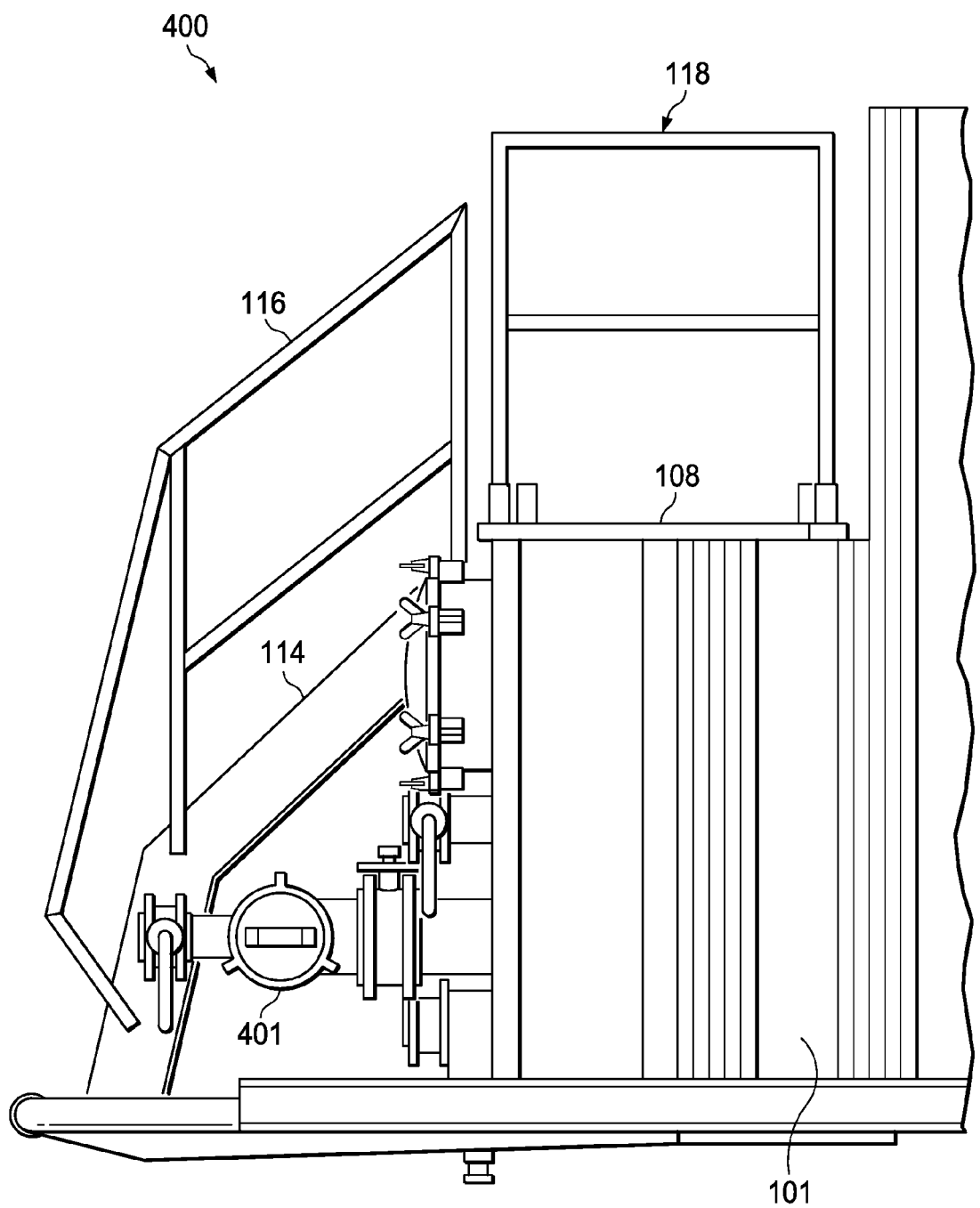
FIG. 4 is a partial side view of an exemplary embodiment of a fluid storage tank in accordance with the present invention.

FIG. 4 is a partial side view of an exemplary embodiment of a fluid storage tank 101. The ladder 114 extends down and away from the walkway 108. The ladder 114 is also shown to be tapered after extending over the external manifold 401. The walkway handrails 118 are positioned generally in-line with the ladder handrails 116 to assist personnel when inspecting the top man way, and prevent personnel from falling off the walkway 108. The walkway handrails 118 in this position are not at the ends of the walkway 108 but are in line with the ladder's 114 handrails 116.

Figure 5:
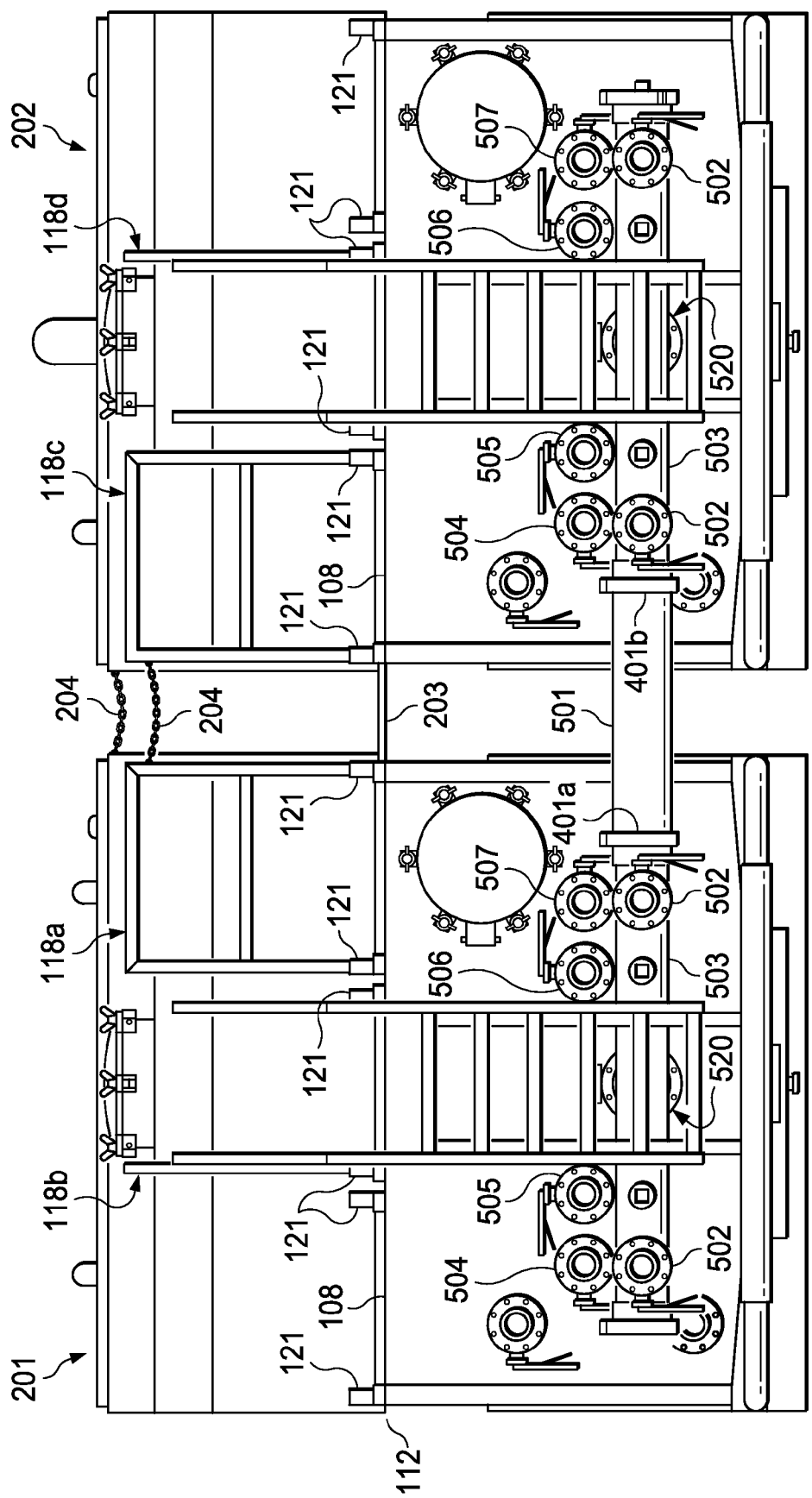
FIG. 5 is a front view of an exemplary embodiment of fluid storage tanks parked adjacent to each other.

FIG. 5 is a front view of an exemplary embodiment of two fluid storage tanks 201 and 202 connected together. The tanks 201, 202 are parked adjacent to each other to provide a continuous walkway between the tanks. The walkway handrails 118a, 118b, 118c, 118d in this embodiment are secured in the appropriate receptacles 121 to prevent personnel from falling off the walkway 108 and to provide support while walking across the walkway 108. A bridge 203 connects the walkways 108 of the two tanks 201, 202. The bridge 203 can be constructed of any suitable material, including aluminum, fiberglass, metal, plastic, etc.

Although not shown, the bridge 203 can be connected to the walkways 108 by being pinned in the grip strut panel.

Further, safety chains 204 can be connected between the handrails 118a, 118c and between the sides of the tanks 201 and 202 adjacent the bridge 203 to help prevent personnel from falling down between the tanks as they walk from one tank to the other. The safety chains 204 can be attached to the handrails and tanks by simple clipping mechanisms or the like. The safety chains can also be replaced with a more rigid structure if desired. For example, a pipe with short chain links attached to each end could be used to provide more rigidity, or a completely rigid structure could be secured between the two tanks.

A suction hose, pipe, or the like 501 can be connected from the external manifold 401a of one tank 201 to the external manifold 401b of the second tank 202 to allow fluids to flow between the tanks. The tanks 201, 202 can utilize a combination internal/external manifold to allow the tank the added versatility of being used in freezing conditions while at the same time providing a larger capacity external manifold assembly 503 that can be used when temperatures are above freezing. In one embodiment, the internal manifold can be contained mostly within the tanks 201, 202, with outlets and butterfly valves 504, 505, 506, 507 extending through the front wall of the tanks 201, 202. In this embodiment, the external manifold assembly 503, which is depicted in the example with two butterfly valves 502, is connected to a large capacity outlet 520 (obscured behind manifold 503, and better seen in FIG. 8) that extends through the front of the tank near a center line of the tank. The large capacity outlet 520 is also in fluid communication with the internal manifold assembly as discussed below with reference to FIG. 7.

Figure 6:
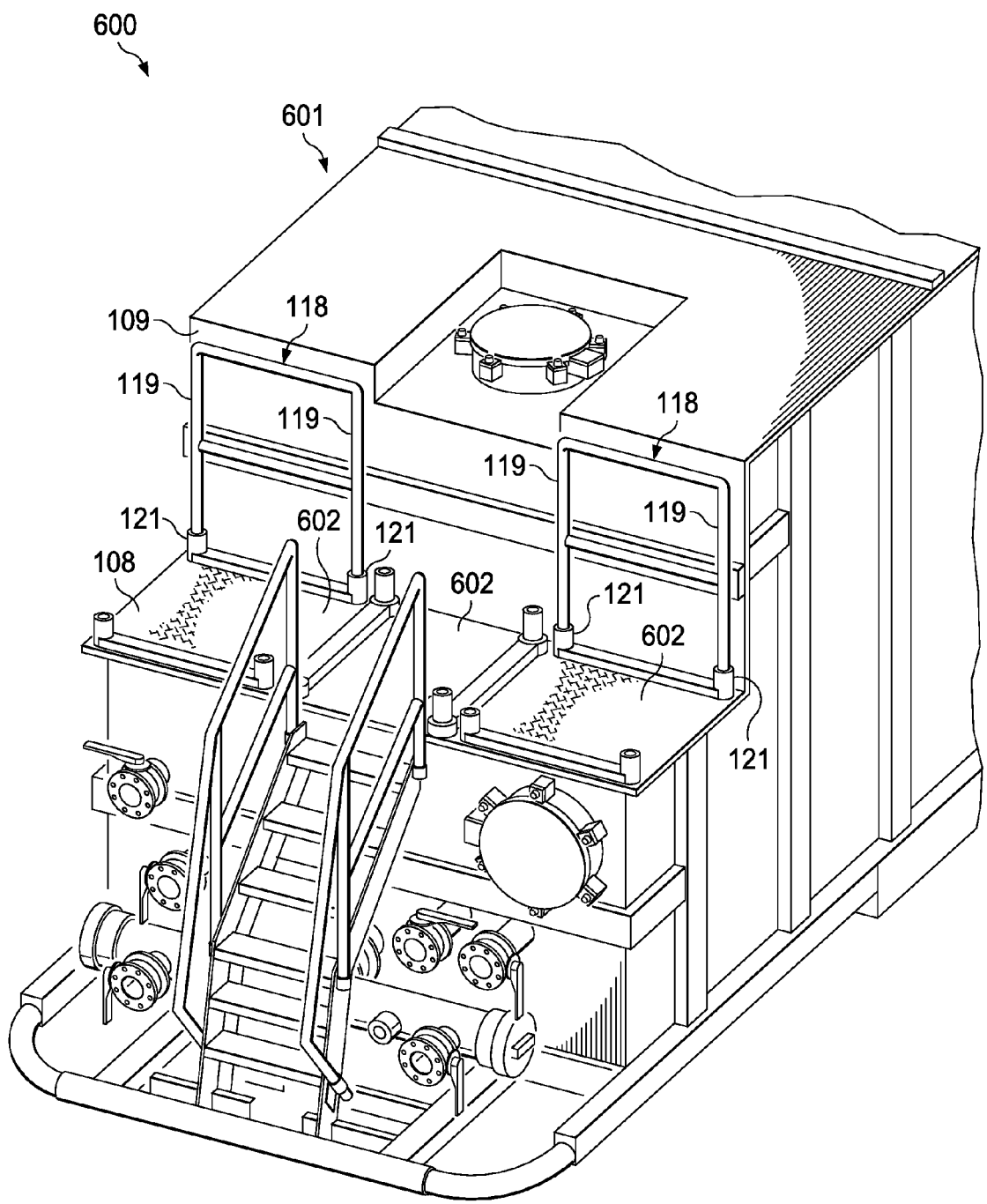
FIG. 6 is a front perspective view of an exemplary embodiment of a fluid storage tank.

FIG. 6 is a partial perspective view of an exemplary embodiment wherein the handrails 118 are positioned on the walkway 108 adjacent the intermediate wall 109 of the tank 601. The handrail legs 119 are secured in receptacles 121 that are attached to the walkway adjacent the wall 109. One advantage of storing the handrails 118 in this position is that the tank can be transported by trucks having a fifth wheel plate as high as 54" and still be within Department of Transportation legal limits of 13'6". This is an advantage over prior tanks because the highest point on the tank when using a fifth wheel plate is typically at the very front of the tank. By effectively moving the forward most portion of the tank back, in this case the hand rails, the overall height of the tank is reduced without sacrificing tank capacity. Also shown in FIG. 6 are grip strut panels 602 that are attached to the walkway 108 and serve as floorboards. The panels 602 may be replaced as they wear out or become damaged, thereby reducing the cost of replacing an entire walkway. Although not shown in the drawing, the panels can be secured to the walkway by bolts, pins, or other means known in the art. The panels 602 can be made from a plurality of materials such as, but not limited to, fiberglass, plastic, aluminum, or steel.

Figure 7:
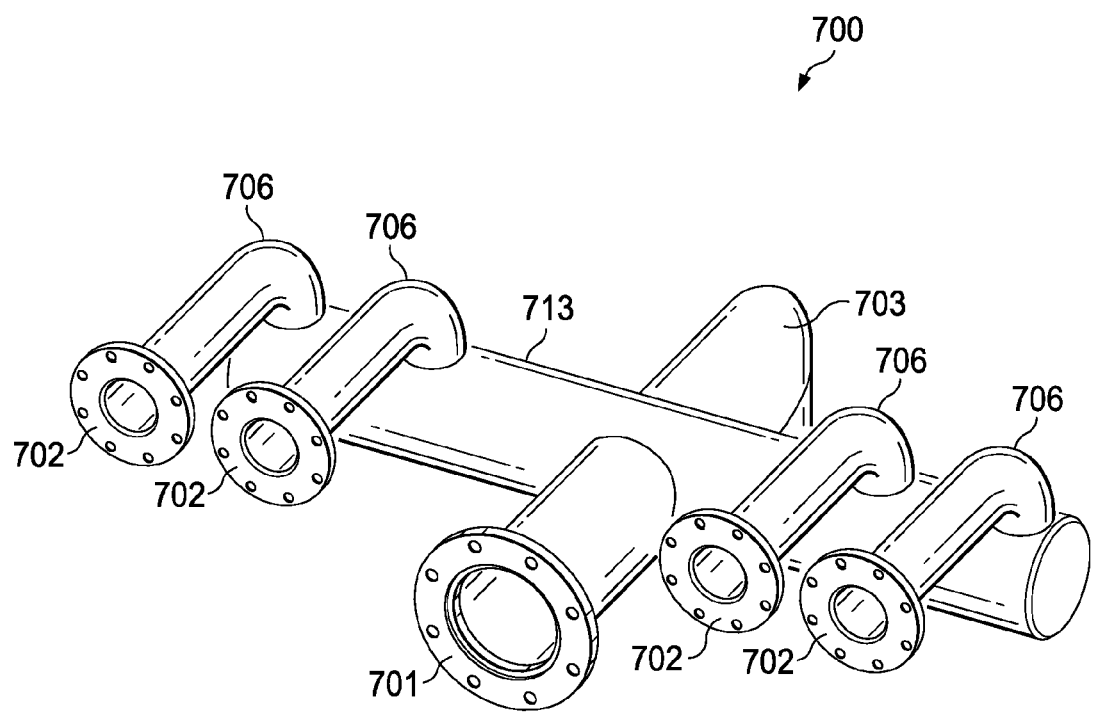
FIG. 7 is a perspective view of an exemplary embodiment of a manifold assembly in accordance with an embodiment of the invention.

FIG. 7 is a perspective view of an exemplary embodiment of a manifold assembly 700. The manifold assembly 700 includes feeder pipes 706, each terminating in a manifold flange 702 that is attached to a manifold 713. The assembly also includes a large capacity flange connection 701 at the center of the manifold 713 to allow the connection of a large capacity manifold. In one embodiment, the manifold assembly 700 is located mostly inside the fluid storage tank and the flanges 701, 702 protrude through the front wall of the tank to allow connection of flanges 702 to butterfly valve assemblies and the connection of the flange 701 to an external manifold connection as shown in FIG. 5. The manifold assembly may contain a pickup 703 attached to the manifold 713, a distal end of which can be located at or near a bottom of the tank for allowing the tank to be emptied and/or filled through the manifold assembly 700. Although an internal/external manifold assembly is illustrated in the figures, it is possible to include the entire manifold assembly inside the tank and simply have outlets from the manifold through the front wall of the tank as is done for the internal manifold assembly discussed. The embodiment illustrated, however, provides better access in non-freezing conditions by having a manifold assembly external to the tank and located closer to the front of the trailer.

Figure 8:
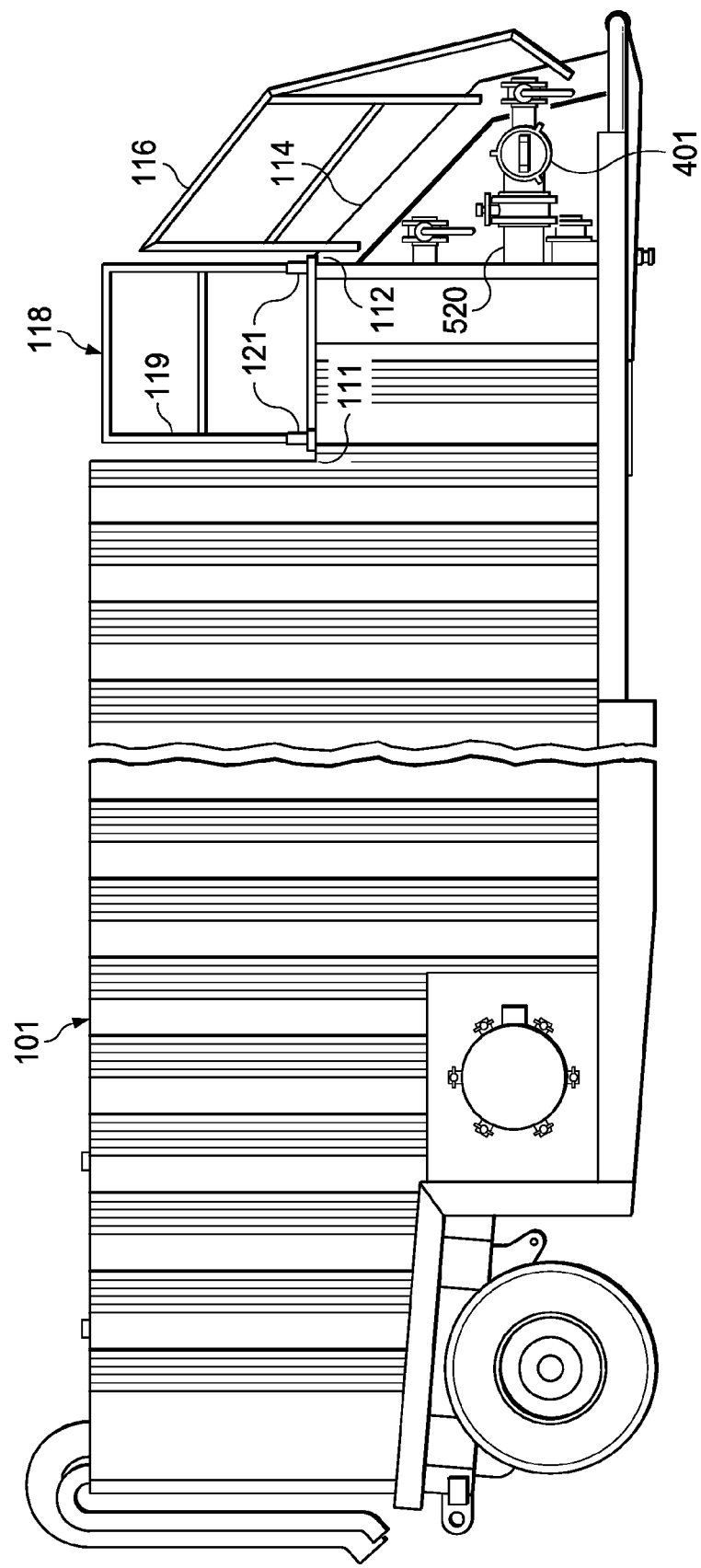
FIG. 8 is a side view of an exemplary embodiment of a fluid storage tank.

FIG. 8 is a side view of an exemplary embodiment of a fluid storage tank. The walkway handrails 118 are in the side position parallel generally in line with the ladder railings 116. The walkway handrail legs 119 are secured in a first receptacle 121 that is adjacent to the front edge of the walkway 112 and a second receptacle 121 that is adjacent to the back edge of the walkway 111. The tapered ladder 114 extends over the external manifold 401.

A fluid storage container and method that includes a walkway built into the body of a storage tank to reduce manufacturing costs and the costs of replacing attachable walkways that damage or deteriorate over time is disclosed. The walkway comprises a handrail system wherein the handrails can be positioned based on the required function of the walkway. For example, in some cases the storage tank utilized alone requires placing the handrails in parallel to the ladder rails to provide support to personnel inspecting man ways on the tank's roof. In other instances, the handrails may be positioned in order to allow a continuous walkway between the walkways of a plurality of adjacently parked tanks. Also, a ladder provides access to the working surface area walkway built into the tank. Further, a method for configuring the walkway areas of multiple tanks parked adjacently to each other in order to provide a continuous walkway is disclosed. This method includes bridging the gap between adjacently parked tanks by means of a bridge and safety chain. Also, a system and method for using dual manifolds comprising an internal and external manifold assembly is disclosed.

What is claimed is:

1. A fluid storage container comprising:
   a movable fluid storage tank having a body supported by a frame, said tank having a storage volume and comprising a first end;
   a deck extending horizontally with a longest dimension extending laterally across a width of the first end of the storage tank, the deck providing an elevated working surface for a user, a portion of the storage volume of the tank located beneath an underside of the working surface, the working surface is lower than a top of said tank, the deck configured to support a removable bridge such that when a second fluid storage container is parked on a first side of said fluid storage container and a third fluid storage container is parked on a second side of said fluid storage container, a user can move between said fluid storage container and said second and third fluid storage containers;
   a ladder providing user access to the working surface from a lower elevation; and
   a plurality of removable rails configured for securing to a plurality of locations on an outboard side of said working surface; said locations comprising a first location generally aligned with a hand rail attached to said ladder and a second location adjacent a front edge of said integral elevated working surface.

2. The fluid storage container of claim 1 further comprising a plurality of receptacles located on said deck for securing said plurality of removable rails.

3. The fluid storage container of claim 1 wherein one of said plurality of locations is a transport position adjacent to a back side of said deck.

4. The fluid storage container of claim 1 wherein the ladder is attached to the deck and allows a user to climb onto said deck and wherein one of said plurality of locations is substantially in-line with said hand rail of said ladder.

5. The fluid storage container of claim 1 wherein one of said plurality of locations is adjacent to and substantially parallel to the outboard side of said deck for preventing a user from falling off said deck.

6. The fluid storage container of claim 1 wherein the first end of the storage tank is a front end, and said deck extends laterally across the front end of said fluid storage container between a front wall of said tank, on said outboard side of said deck, and an intermediate wall of said tank, on an inboard side of said deck.

7. The fluid storage container of claim 6 wherein said deck is configured to allow a user to view an inside of said tank through a manway on a roof of said tank while standing on said deck.

8. The fluid storage container of claim 6 wherein said front wall and said intermediate wall are substantially vertical and spaced apart, and said elevated working surface extends laterally across the space between the front and intermediate walls from a base of the intermediate wall to a top of the front wall.

9. The fluid storage container of claim 1 further comprising a dual manifold assembly.

10. The fluid storage container of claim 9 wherein said dual manifold assembly comprises an internal manifold assembly that can be used during freezing temperatures and an external manifold assembly that can be used when temperatures are above freezing.

11. A fluid storage tank trailer comprising:
a base having a set of wheels attached thereto;
a tank attached to said base, said tank having an integral elevated working surface at an end of said tank that is higher than said base and lower than a top of said tank wherein a storage portion of said tank is located beneath an underside of the elevated working surface, the elevated working surface extending across a width of said tank such that when a second fluid storage tank trailer is parked on a first side of said fluid storage tank trailer and a third fluid storage tank trailer is parked on a second side of said fluid storage tank trailer, a user can utilize said integral elevated working surface to move between said fluid storage tank trailer and said second and third fluid storage tank trailers without first descending to a ground level;
a stairway attached to said integral elevated working surface for allowing a user to climb onto said integral elevated working surface from said ground level; and
a plurality of movable rails configured for attachment to said integral elevated working surface in a plurality of locations, said locations comprising a first location generally aligned with a hand rail attached to said stairway and a second location adjacent a front edge of and generally parallel to said integral elevated working surface.

12. The fluid storage tank trailer of claim 11 wherein said integral elevated working surface is located at a front end of said tank and said plurality of locations further comprises a third location adjacent an intermediate wall that borders a rear edge of said integral elevated working surface.

13. The fluid storage tank trailer of claim 11 wherein said tank comprises an access port on the top of said tank and wherein said user can utilize the access port while standing on said integral elevated working surface.

14. The fluid storage container of claim 11 wherein the integral elevated working surface is configured to allow the use of a bridge to connect said fluid storage tank trailer to a second working surface of an adjacent tank such that said bridge forms a continuous walkway between said integral elevated working surface and said adjacent tank.

15. A fluid storage container comprising:
a tank having a storage volume for holding fluids;
an internal manifold for use during below freezing temperatures, said internal manifold comprising a feeder pipe section having a plurality of flanges connected to a plurality of feeder pipes, said feeder pipe section extending through the wall of the tank, and said plurality of flanges positioned outside said wall of said tank, said internal manifold comprising a central pipe in fluid communication with said plurality of feeder pipes;
an external manifold positioned outside said wall for use during above freezing temperatures said external manifold connected through said wall to said central pipe; and
an elevated working surface at an end of said tank, the working surface lower than a top of said tank, a portion of the storage volume of said tank extending to a location vertically beneath an underside of the elevated working surface, the elevated working surface extending across a width of said tank such that when a second fluid storage container is parked on a first side of said fluid storage container and a third fluid storage container is parked on a second side of said fluid storage container, a user can utilize said integral elevated working surface to move between said fluid storage container and said second and third fluid storage containers without first descending to a ground level;
a stairway attached to said integral elevated working surface for allowing a user to climb onto said integral elevated working surface from said ground level; and
a plurality of movable rails configured for attachment to said integral elevated working surface in a plurality of locations, said locations comprising a first location generally aligned with a hand rail attached to said stairway and a second location adjacent a front edge of said integral elevated working surface.

16. The fluid storage container of claim 15 wherein said external manifold comprises a second central pipe that extends between said first side and said second side of said fluid storage container.

\* \* \* \* \*